United States Patent
Carrera et al.

(10) Patent No.: US 8,737,245 B2
(45) Date of Patent: May 27, 2014

(54) METHOD FOR EVALUATING LINK COST METRICS IN COMMUNICATION NETWORKS

(75) Inventors: Marianna Carrera, Vanves (FR); Henrik Lundgren, Le Plessis Robinson (FR); Theodoros Salonidis, Paris (FR); Christophe Diot, Paris (FR)

(73) Assignee: Thomson Licensing, Issy-les-Moulineaux (FR)

( * ) Notice: Subject to any disclaimer, the term of this patent is extended or adjusted under 35 U.S.C. 154(b) by 204 days.

(21) Appl. No.: 12/998,981

(22) PCT Filed: Dec. 17, 2009

(86) PCT No.: PCT/EP2009/067449
§ 371 (c)(1),
(2), (4) Date: Jun. 21, 2011

(87) PCT Pub. No.: WO2010/072652
PCT Pub. Date: Jul. 1, 2010

(65) Prior Publication Data
US 2011/0255429 A1    Oct. 20, 2011

(30) Foreign Application Priority Data

Dec. 23, 2008 (EP) .................................. 08306005

(51) Int. Cl.
*H04L 1/00* (2006.01)
*H04L 12/26* (2006.01)

(52) U.S. Cl.
USPC ........................... 370/252; 370/230; 370/235

(58) Field of Classification Search
USPC .................................. 370/232, 235, 252, 230
See application file for complete search history.

(56) References Cited

U.S. PATENT DOCUMENTS

| | | | |
|---|---|---|---|
| 6,996,374 B1 * | 2/2006 | Bao et al. | 455/67.11 |
| 7,933,557 B1 * | 4/2011 | Townley et al. | 455/67.11 |
| 8,259,600 B1 * | 9/2012 | Dinan et al. | 370/252 |
| 2003/0096606 A1 * | 5/2003 | Inman et al. | 455/424 |
| 2004/0165532 A1 * | 8/2004 | Poor et al. | 370/238 |
| 2005/0083848 A1 * | 4/2005 | Shao et al. | 370/238 |
| 2005/0107106 A1 * | 5/2005 | Valkealahti et al. | 455/522 |
| 2005/0221829 A1 * | 10/2005 | Nishida et al. | 455/440 |
| 2005/0249215 A1 * | 11/2005 | Kelsey et al. | 370/392 |
| 2006/0104205 A1 * | 5/2006 | Strutt et al. | 370/238 |
| 2007/0097873 A1 * | 5/2007 | Ma et al. | 370/252 |

(Continued)

OTHER PUBLICATIONS

Carrera et al., "Correlating Wireless Link Cost Metrics to Capacity," Feb. 2, 2009, IEEE, Sixth International Conference on Wireless On-Demand Network Systems and Services, pp. 1-8.*

(Continued)

*Primary Examiner* — Derrick Ferris
*Assistant Examiner* — Joe Combs
(74) *Attorney, Agent, or Firm* — Myers Wolin LLC

(57) ABSTRACT

The present invention relates to a method for measuring link cost metrics and evaluating their accuracy with respect to reference measure of link quality in a communication network, said method comprising the steps of: during a given time interval, simultaneously transmitting several types of probe packets and data traffic, and estimating a plurality of link cost metrics (metricA, metricB, . . . , metricN) and a reference measure of link quality for a set of communication links; evaluating the accuracy of the estimated link cost metrics (metricA, metricB, . . . , metricN) by computing their correlation with the reference measure of link quality; and collecting cross-layer information for each probe packet.

6 Claims, 2 Drawing Sheets

```
During a given time interval, simultaneously transmitting
several types of probe packets and data traffic, and
estimating a plurality of link cost metrics (metricA,
metricB, ..., metricN) and a reference measure of link
quality for a set of communication links
                    |
                    v
Evaluating the accuracy of the estimated link cost
metrics (metricA, metricB, ..., metricN) by computing
their correlation with the reference measure of link
quality
                    |
                    v
Collecting cross-layer information for each probe packet
```

(56) References Cited

U.S. PATENT DOCUMENTS

| | | |
|---|---|---|
| 2007/0195715 A1* | 8/2007 | Yamano et al. ............... 370/254 |
| 2008/0150714 A1* | 6/2008 | Bauer et al. ............. 340/539.22 |
| 2009/0109901 A1* | 4/2009 | Kondo et al. ................ 370/328 |
| 2009/0124252 A1* | 5/2009 | Jin et al. ........................ 455/425 |
| 2009/0213849 A1* | 8/2009 | Sachs et al. ................... 370/389 |
| 2009/0219990 A1* | 9/2009 | Han et al. ................. 375/240.02 |
| 2010/0131664 A1* | 5/2010 | Veres ............................ 709/228 |
| 2010/0246485 A1* | 9/2010 | Potkonjak .................... 370/328 |
| 2011/0249559 A1* | 10/2011 | Sun et al. ...................... 370/237 |
| 2011/0299389 A1* | 12/2011 | Mau et al. .................... 370/230 |

OTHER PUBLICATIONS

De Couto et al., "A High-Throughput Path Metric for Multi-hop Wireless Routing", Wireless Networks; The Journal of Mobile Communication, Computation and Information, vol. 11, No. 4, Jul. 1, 2005, pp. 419-434.

Angrisani et al., "Cross-Layer Measurements for a Comprehensive Characterization of Wireless Networks in the Presence of Interference", IEEE Transactions on Instrumentation and Measurement, vol. 56, No. 4, Aug. 1, 2007, pp. 1148-1156.

Search Report Dated April 26, 2010.

* cited by examiner

METHOD FOR EVALUATING LINK COST METRICS IN COMMUNICATION NETWORKS

This application claims the benefit, under 35 U.S.C. §365 of International Application PCT/EP2009/067449, filed Dec. 17, 2009, which was published in accordance with PCT Article 21(2) on Jul. 1, 2010 in English and which claims the benefit of European patent application No. 08306005.3, filed Dec. 23, 2008.

FIELD OF THE INVENTION

The present invention pertains to the field of communication networks.

The present invention more particularly relates to a method for evaluating link cost metrics in communication networks.

BACKGROUND OF THE INVENTION

Mesh networks are 802.11-based multi-hop wireless backbones that provide low-cost Internet access in urban areas. Crucial to the performance of mesh networks is the routing protocol operation, and significant research effort has been devoted to metrics that identify high quality paths. First, it was shown that link cost metrics that estimate link quality by periodic probing can compose path metrics that yield significant throughput gains over minimum hop count (D. D. Couto, D. Aguayo, J. Bicket, and R. Morris, "*A high-throughput path metric for multi-hop wireless routing*" in Proc. MobiCom, 2003). Further throughput improvements have been achieved by link cost and path metrics that incorporate multi-channel diversity (R. Draves, J. Padhye, and B. Zill, "*Routing in multi-radio, multi-hop wireless mesh networks*" in Proc. MobiCom, 2004), interference (A. Subramanian, M. Buddhikot, and S. Miller, "*Interference Aware Routing in Multi-radio Wireless Mesh Networks*" in Proc. WiMe 2006 and Y. Yang, J. Wang, and R. Kravets, "*Interference-aware load balancing for multihop wireless networks*" University of Illinois at Urbana-Champaign, Tech. Rep., 2005), or congestion (T. Salonidis, M. Garetto, A. Saha, and E. Knightly, "*Identifying Highthroughput Paths in 802.11 Mesh Networks: a Model-based Approach*" in Proc. ICNP, 2007). Path metrics are typically evaluated in terms of their static properties by running separate back-to-back experiments under identical traffic patterns and comparing UDP or TCP throughput (R. Draves, J. Padhye, and B. Zill, "*Comparison of Routing Metrics Static Multi-hop Wireless Networks*" in Proc. SIGCOMM, 2004 and Y. Yang, J. Wang, and R. Kravets, "*Designing Routing Metrics for Mesh Networks*" Proc. WiMesh, 2005).

Despite extensive work on path metrics, the ability of the underlying link cost metrics to accurately estimate wireless link quality under dynamic conditions has not yet been quantified. Link cost metrics are inherently inaccurate because, instead of a direct measure like throughput or delay, they only estimate an indirect measure of link quality using a limited number of probe packets. The ability of a link cost metric to estimate link quality depends both on its definition and on its measurement method. Quantifying this ability is crucial to the performance of the mesh routing protocol, especially under dynamic operation. If a link cost metric does not track the variation of link quality, the routing algorithm cannot react properly. On the other hand, if a link cost metric varies while the link quality does not, the routing algorithm will take unnecessary or erroneous actions. Previous studies of link cost metric dynamics (A. Subramanian, M. Buddhikot, and S. Miller, "*Interference Aware Routing in Multi-radio Wireless Mesh Networks*" in Proc. WiMe 2006 and S. Das, H. Pucha, K. Papagianakki, and Y.-C. Hu, "*Studying wireless routing link metric dynamics*" in Proc. IMC, 2007) have observed sensitivity to network traffic but do not connect metric variations to variations of a direct measure of link quality.

Examples of the methodology applied by previous works follow.

De Couto et al. (D. D. Couto, D. Aguayo, J. Bicket, and R. Morris, "*A high-throughput path metric for multi-hop wireless routing*," in Proc. MobiCom, 2003) propose ETX as link cost and path metric. They study the accuracy of ETX (as a link metric) by comparing it to the number of retransmissions experienced by UDP packets. These two quantities are measured at different points in time (one minute apart), and for a very short duration (1 second and 10 seconds, respectively). Although the authors list some of the weaknesses of this estimation technique, they do not quantify the impact of these shortcomings. In contrast, the inventors of the present invention compare simultaneously estimated quantities, and show how different shortcomings manifest in the metrics' correlation to the link capacity.

Draves et al. (R. Draves, J. Padhye, and B. Zill, "*Routing in multi-radio, multi-hop wireless mesh networks*" in Proc. MobiCom, 2004) propose ETT, a link cost metric, and WCETT, a routing metric. They do not study the accuracy of ETT as link metric, but study the accuracy of the estimation of the link's bit-rate by the packet pair technique. However, their evaluation is limited to two nodes in close proximity, and this experimental setting suppresses the shortcomings of this technique since the number of retransmissions is likely to be small and stable. In contrast, the work, by the inventors of the present invention, that lead to the present invention covers a large set of links with different characteristics, and consequently provides a more realistic evaluation.

Das et al. (S. Das, H. Pucha, K. Papagianakki, and Y.-C. Hu, "*Studying wireless routing link metric dynamics*" in Proc. IMC, 2007) study three link cost metrics: ETX, ETT and the links bandwidth estimated by the packet pair technique. They investigate the link metrics' dynamic behavior and their sensitivity to traffic in the network. However, they do not quantify the accuracy of these link metrics and do not correlate to the variation of a direct measure of the link's quality. Subramanian et al. (A. Subramanian, M. Buddhikot, and S. Miller, "*Interference Aware Routing in Multi-radio Wireless Mesh Networks*" in Proc. WiMe 2006) propose iAWARE, a link and routing metric. The link version of iAWARE is compared to ETT and IRU (Y. Yang, J. Wang, and R. Kravets, "*Interference-aware load balancing for multihop wireless networks*" University of Illinois at Urbana-Champaign, Tech. Rep., 2005) in one controlled scenario to show the poor interference awareness of ETT and IRU.

Kim and Shin (K.-H. Kim and K. Shin, "*On accurate measurement of link quality multi-hop wireless mesh networks*" in Proc. MobiCom, 2006) propose a complex probing system (EAR), which relies on the standard MAC MIB interface to query the driver for MAC layer statistics. This work is complementary to the work performed by the inventors of the present invention and this system may be used to retrieve the cross layer information used by the method according to the present invention. They study the accuracy of the estimation of the frame delivery ratio by several approaches. However, the compared estimations are taken at different points in time. On the contrary, one fundamental aspect of the method according to the present invention is the comparison of simultaneous measurements.

Draves et al. (R. Draves, J. Padhye, and B. Zill, "*Comparison of Routing Metrics Static Multi-hop Wireless Networks*" in Proc. SIGCOMM, 2004) compare four path metrics: Hop Count, Per-hop Round Trip Time, Per-hop Packet Pair Delay, and ETX. Yang et al (Y. Yang, J. Wang, and R. Kravets, "*Interference-aware load balancing for multihop wireless networks*" University of Illinois at Urbana-Champaign, Tech. Rep., 2005) propose the MIC path metric which relies on several link's characteristics, including ETT. Both these work present and compare path metrics, focusing on the performance and characteristics of the discovered routing paths. However, neither the behavior nor the accuracy of the underlying link cost metric has been evaluated.

SUMMARY OF THE INVENTION

The present invention aims at solving the above-mentioned drawbacks of the prior art solutions.

The inventors of the present invention introduce a methodology that quantifies the ability of link cost metrics to accurately estimate a reference measure of wireless link quality under dynamic conditions. In the context of the present invention, a reference link quality measure definition, an experimental component that performs measurements and an analysis component that processes these measurements are proposed. One example of reference link quality measure is the link capacity, defined as the maximum UDP goodput of each link in absence of contention from other links in the network.

The experimental component includes simultaneous and cross layer measurements of the reference link quality measure and all link cost metrics under evaluation. Simultaneous measurements enable fair and precise comparison of the estimation accuracy of all link cost metrics with respect to the reference link quality measure under identical channel conditions. Cross-layer measurements enable deeper analysis of the behavior of 802.11 wireless links. The analysis component of the methodology according to the present invention uses linear regression to correlate the simultaneous link cost metric values and link capacity values measured by the experimental component. The squared correlation coefficient is used to quantify and summarize the ability of each link cost metric to track link capacity variations both across time and across several links in the mesh network.

The present invention is defined, in its broader sense, as a method for measuring link cost metrics and evaluating their accuracy with respect to reference measure of link quality in a communication network, said method comprising the steps of:
 during a given time interval, simultaneously transmitting several types of probe packets and data traffic, and estimating a plurality of link cost metrics (metricA, metricB, . . . , metricN) and a reference measure of link quality for a set of communication links;
 evaluating the accuracy of the estimated link cost metrics (metricA, metricB, . . . , metricN) by computing their correlation with the reference measure of link quality; and
 collecting cross-layer information for each probe packet.

Preferably, a squared correlation coefficient is used to quantify and summarize the ability of each cost metric to track link capacity variations across time and across several links in the communication network.

According to an embodiment, the reference measure of link quality is the capacity of the link.

According to another embodiment, the step of simultaneously estimating different link cost metrics (metricA, metricB, . . . , metricN) and the reference measure of link quality is performed sequentially on different links.

Advantageously, the cross-layer information comprises the exact number of MAC (Media Access Control) retransmissions.

Preferably, the cross-layer information comprises a list of bit-rates used for retransmissions.

According to an embodiment, the cross-layer information comprises the outcome of final transmission, which determines if a network layer packet is successfully delivered.

Preferably, each link cost metric or a function of it is connected to the reference measure of link quality or a function of it using linear regression.

According to an embodiment, each link cost metric is expressed as M=a+bC, where C is the reference measure of link quality, and a and b are real numbers determined using linear regression.

Advantageously, based on the samples of M and C, a squared correlation coefficient is computed as $$R^2 = \frac{[\text{cov}(M, C)]^2}{\text{var}(M) \cdot \text{var}(C)}$$

where cov(M,C), var(M) and var(C) denote covariance, and sample variance of M and C, respectively.

The advantages provided by the present invention are the following:
 This combined experimental and analysis methodology quantifies the correlation between wireless link metrics and link quality. It is based on a careful and systematic approach to relating the link metrics' behavior to a reference link quality measure.
 The inventors of the present invention have demonstrated the feasibility and strength of the methodology according to the present invention by applying it to the study of two critical properties of wireless link metrics: (i) the metrics' capability of tracking link quality changes over time, and (ii) the metrics' capability of correctly ranking links according to their quality. In addition, by using detailed cross layer information, it is possible to explain the reasons why a link cost metric estimation shows little accuracy in representing the reference link quality.

BRIEF DESCRIPTION OF THE DRAWINGS

The following detailed description will be better understood with the drawings, in which.

DETAILED DESCRIPTION OF THE EMBODIMENTS OF THE INVENTION

Figure 1:
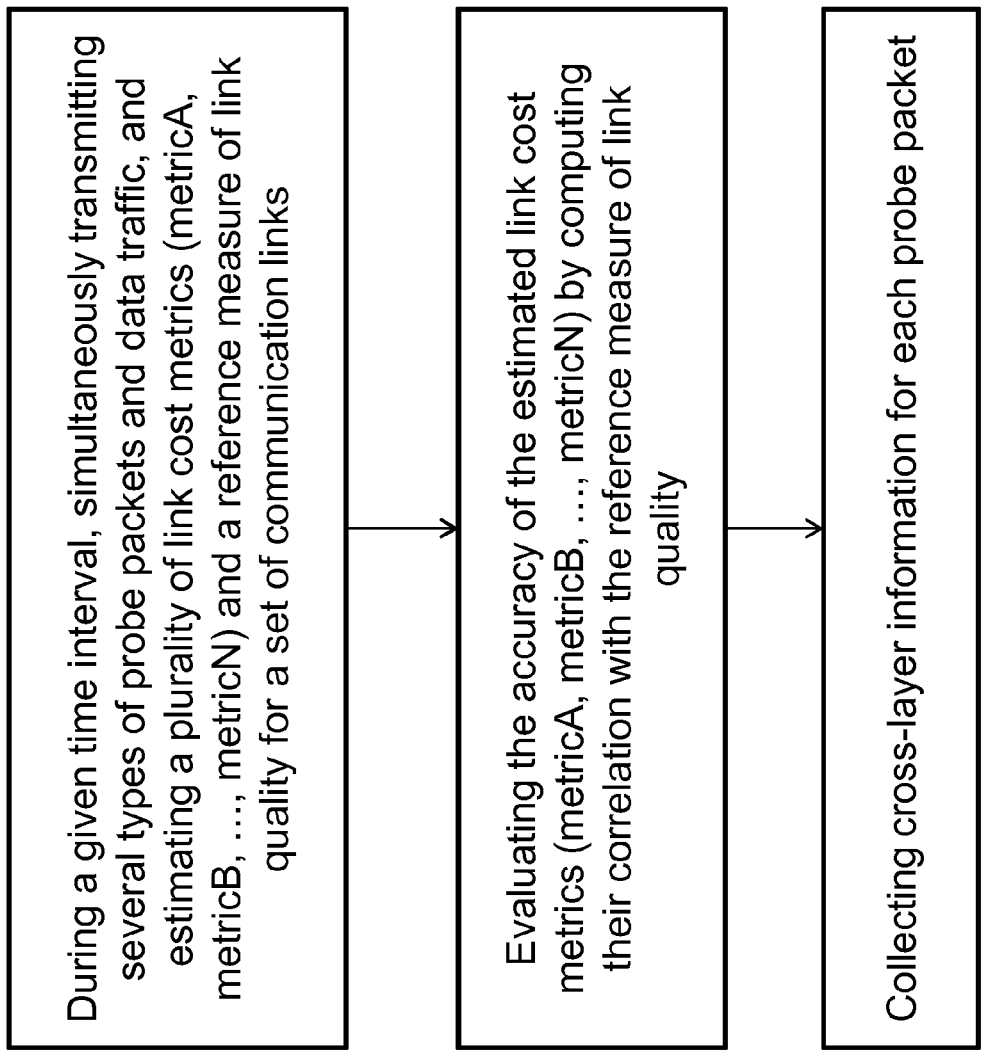
FIG. 1 is a flow-chart representing the method according to the present invention.

Link cost metrics typically measure characteristics of probe packets (e.g., losses and delays) and combine them to estimate the link's quality. This estimation can be inaccurate: the measured characteristics of probes approximate only to some extent the characteristics of data packets, the combination of such characteristics only captures some of the factors which affect link quality. In order to quantify the accuracy of this estimation, there is a need to define a reference link quality measure.

According to one embodiment, the link quality is defined as the link capacity: the maximum goodput achievable on the link. Unlike the capacity of wired links, the capacity of wireless links varies over time, due to a variable transmission bit-rate, an unreliable physical medium and a variable number of MAC-layer retransmissions. This definition of link quality can be directly measured as the goodput of a backlogged UDP flow in absence of interference due to contention with other links in the network.

As it will be shown below, even in absence of contention interference, link cost metrics can be inaccurate. Once the accuracy in absence of contention interference has been understood, other definitions of link quality may be used to study the accuracy of link cost metrics under contention. According to this embodiment, each experiment consists in a backlogged UDP flow between two wireless neighbors. During each experiment, the UDP flow is the only traffic in the network, except for the probe packets used to estimate the link cost metrics of interest. The goodput of the UDP flow is measured as received bytes per time unit. Long lasting experiments are performed, on the order of hours, to study the time evolution of all the quantities of interest.

All the quantities of interest (i.e., the reference measure of link quality and all the link cost metrics under evaluation) are measured simultaneously. This aspect of the experimental methodology in the frame of the present invention yields a set of quantities which have experienced identical link conditions. Since they all estimate an identical link quality, it is fair to compare them. The estimations of all the link metrics and the link capacity are denoted referring to the same time interval (t, −τ, t], as (metricA, metricB, . . . , capacity)$_t$. Each of these sets is a sample of the relation between each link cost metric and the link capacity. Moreover, by running long lasting experiments, time-series of such sets of simultaneous measurements are collected, and it is thus possible to compare the evolution of each quantity over time. In one embodiment, in order to perform simultaneous measurements, the system according to the present invention continuously sends different types of probes to estimate the link cost metrics under evaluation together with the traffic needed to measure the link quality (in this study, the UDP backlogged flow). The probes are periodically sent also on the link loaded by the backlogged UDP flow.

The analysis methodology according to the present invention quantifies the accuracy of a link cost metric estimation by computing its correlation with the reference link quality measure, i.e., as defined above, the link's capacity. The inventors of the present invention have evaluated two complementary aspects: to what extent the variations of the link capacity are captured and reflected by each link metric, and, vice versa, to what extent the variations of a link metric are explained by variations in the link capacity. The analysis methodology according to the present invention returns a coefficient, ranging between 0 and 1, which quantifies the accuracy of the estimation of link quality done by a link cost metric, according to both these aspects. The analysis uses data set of simultaneous estimations, (metricA, metricB, . . . , capacity)$_t$, obtained as detailed above. For simplicity, the analysis is described considering a single link cost metric, referring to a set of (metric, capacity)$_t$ measurements. The same analysis applies to each link cost metric under evaluation. Recall that each (metric, capacity)$_t$ pair is a sample of the relation between the link metric and the link capacity. The inventors have expected this relation to be inversely proportional: the higher is the cost of a link, the lower is its capacity, and vice versa. This inversely proportional relation is expressed in a general form as:

$$\text{metric} = \frac{\alpha}{(\text{capacity})^\beta}. \quad (1)$$

The same relation is considered in log-scale:

$$M = a - bC, \quad (2)$$

where a and b are functions of α and β in Eq. (1), and M and C are the logarithms of the link metric and the link capacity, respectively. Then, the squared correlation coefficient ($R^2$) of the samples of M and C are computed. This squared correlation coefficient ranges between 0 and 1, and is defined as:

$$R^2 = \frac{[\text{cov}(M, C)]^2}{\text{var}(M) \cdot \text{var}(C)}, \quad (3)$$

where cov(M,C), var(M) and var(C) denote covariance, and sample variance of M and C, respectively. Since the relation of M and C is linear, $R^2$ measures the amount of variation of the link metric which is explained by the variation in the link capacity, and vice versa. Likewise, the complement of the squared correlation coefficient ($1-R^2$) represents both the amount of metric variation that is not related to capacity variation, and the amount of capacity variation that is not captured by the metric. If a link cost metric varies while the capacity does not, it may induce the routing algorithm to avoid a good link or select a bad link. On the other hand, if a link cost metric does not capture the variation of the link capacity, the routing algorithm will not be able to react to improvements or degradations of a link's condition. The interpretation of the results of this methodology depends on the characteristics of the input data set. For example, given a data set consisting of subsequent measurements from a single link, the ability of a metric is evaluated to track the capacity variation over time; while, given a data set consisting of measurements from several different links, the consistency of the relation metric-capacity is evaluated across links.

The last aspect of the methodology according to the present invention consists in collecting cross layer information, throughout the whole duration of all the experiments. The performance of 802.11 links are affected by several mechanisms, such as the retransmissions of unicast DATA frames and the multirate support. Collecting cross layer information gives an important insight on the link's status and behavior, which can be used to explain the inaccuracy of the studied link cost metrics. In one embodiment, the wireless card driver is modified to record, for each unicast network layer probe, the exact number of MAC layer retransmissions, the list of the bit-rates used for all the retransmissions, and the outcome of the final transmission, which determines if the network layer packet is successfully delivered. This information is collected periodically and continuously over time.

Given two link cost metrics under evaluation, this methodology is applied to the study of the accuracy of these metrics with respect to two important properties of a link cost metric: i) the ability to track the link capacity variation over time, and ii) the consistency across several links of the inverse proportional relation of each metric against the link's capacity.

Several links are considered in the tested and simultaneous measurements of the capacity and the link cost metrics, are performed, link by link, using in turn all available bit-rates. The data is organized into sets, each consisting of measurements from a single link using one fixed bit-rate. In each dataset, the measurements last up to two hours, during which the capacity may vary considerably or remain stable. In this part of the study, the inventors of the present invention are interested in the data sets where the capacity varies, in order to study the ability of the link cost metrics to track its variation.

Figure 2:
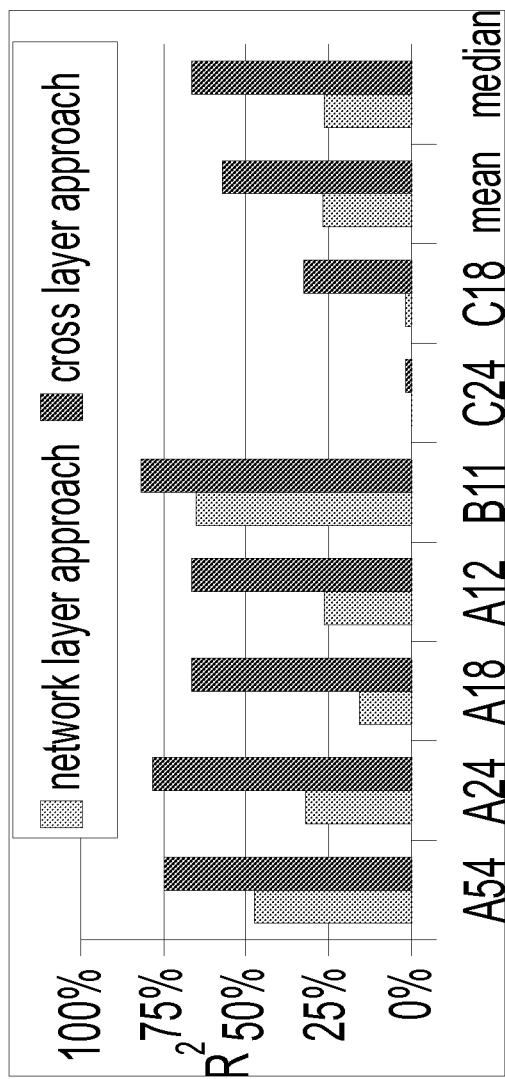
FIG. 2 shows an example of representation of the results obtained by the method according to the present invention.

FIG. 2 shows an example of representation of the results obtained by the method according to the present invention, which allows an easy and intuitive comparison of the accuracy of the two link cost metrics under evaluation.

FIG. 2 shows an histogram of the squared correlation coefficients (R2) of the two link cost metrics under evaluation, for seven example data sets that demonstrate the high variability in link capacity, along with the mean and median accuracy across the considered datasets.

FIG. 2 represents the ability of each link cost metric to track the capacity variation over time.

The method according to the present invention can be used to study the consistency across links of the inversely proportional relation between a link cost metric against the link capacity. One hour long experiments, link by link, have been performed by the inventors of the present invention, collecting the simultaneous measurements according to the method of the present invention. In contrast with the study in the previous section, data sets are now considered consisting of measurements from several links. On each link, the capacity may vary considerably or remain stable. By considering measurements taken on several links, it is possible to obtain a variety of samples of the relation between metric and capacity, spanning a wide range of link capacity values and metric values. Ideally, all the metric-capacity pairs should describe the same inversely proportional relation with the link capacity, regardless of the link where the measurements have been taken. The squared correlation coefficient of such data sets expresses the consistency of this relation across links. A metric with low consistency across links would be incapable of ranking different links according to their capacity. To compare the metrics' accuracy, it is possible to use the same type of graph as used in FIG. 2.

The method according to the present invention allows to investigate the reasons for the inaccuracy identified in the previous steps. The time evolution of the estimations of the components of a link cost metric is analyzed and compared to the time evolution of cross layer information.

The above specification, examples and drawings provide a complete description of the method according to the present invention. Since many embodiments of the invention can be made without departing from the spirit and scope of the invention, the invention resides in the claims herein after appended.

The invention claimed is:

1. Method for measuring link cost metrics and evaluating their accuracy with respect to reference measure of link quality in a communication network, said method comprising:
during a given time interval, simultaneously transmitting several types of probe packets and data traffic, and estimating a plurality of link cost metrics (metricA, metricB, . . . , metricN) and a reference measure of link quality for a set of communication links;
evaluating the accuracy of the estimated link cost metrics (metricA, metricB, . . . , metricN) by computing their correlation with the reference measure of link quality; and
collecting cross-layer information for each probe packet,
wherein a squared correlation coefficient is used to quantify and summarize the ability of each cost metric to track link capacity variations across time and across several links in the communication network,
wherein each link cost metric or a function of it is connected to the reference measure of link quality or a function of it using linear regression,
wherein each link cost metric is expressed as M=a+bC, where C is the reference measure of link quality, and a and b are real numbers determined using linear regression, and
wherein, based on the samples of M and C, the squared correlation coefficient is computed as $$R^2 = \frac{[\text{cov}(M, C)]^2}{\text{var}(M) \cdot \text{var}(C)}$$

where cov(M,C), var(M) and var(C) denote covariance, and sample variance of M and C, respectively.

2. Method for measuring link cost metrics and evaluating their accuracy with respect to reference measure of link quality in a communication network according to claim 1, wherein the reference measure of link quality is the capacity of the link.

3. Method for measuring link cost metrics and evaluating their accuracy with respect to reference measure of link quality in a communication network according to claim 1, wherein the step of simultaneously estimating different link cost metrics (metricA, metricB, . . . , metricN) and the reference measure of link quality is performed sequentially on different links.

4. Method for measuring link cost metrics and evaluating their accuracy with respect to reference measure of link quality in a communication network according to claim 1, wherein the cross-layer information comprises the exact number of MAC (Media Access Control) retransmissions.

5. Method for measuring link cost metrics and evaluating their accuracy with respect to reference measure of link quality in a communication network according to claim 1, wherein the cross-layer information comprises a list of bitrates used for retransmissions.

6. Method for measuring link cost metrics and evaluating their accuracy with respect to reference measure of link quality in a communication network according to claim 1, wherein the cross-layer information comprises the outcome of final transmission, which determines if a network layer packet is successfully delivered.

* * * * *